3,065,248
PROCESS FOR ISOMERIZATION OF OLEIC ACID AND ITS DERIVATIVES
Louise H. Brown, Santa Monica, and Ronald Swidler, West Covina, Calif., assignors to Tallow Research, Incorporated, San Francisco, Calif., a corporation of California
Filed Feb. 1, 1960, Ser. No. 5,909
19 Claims. (Cl. 260—405.6)

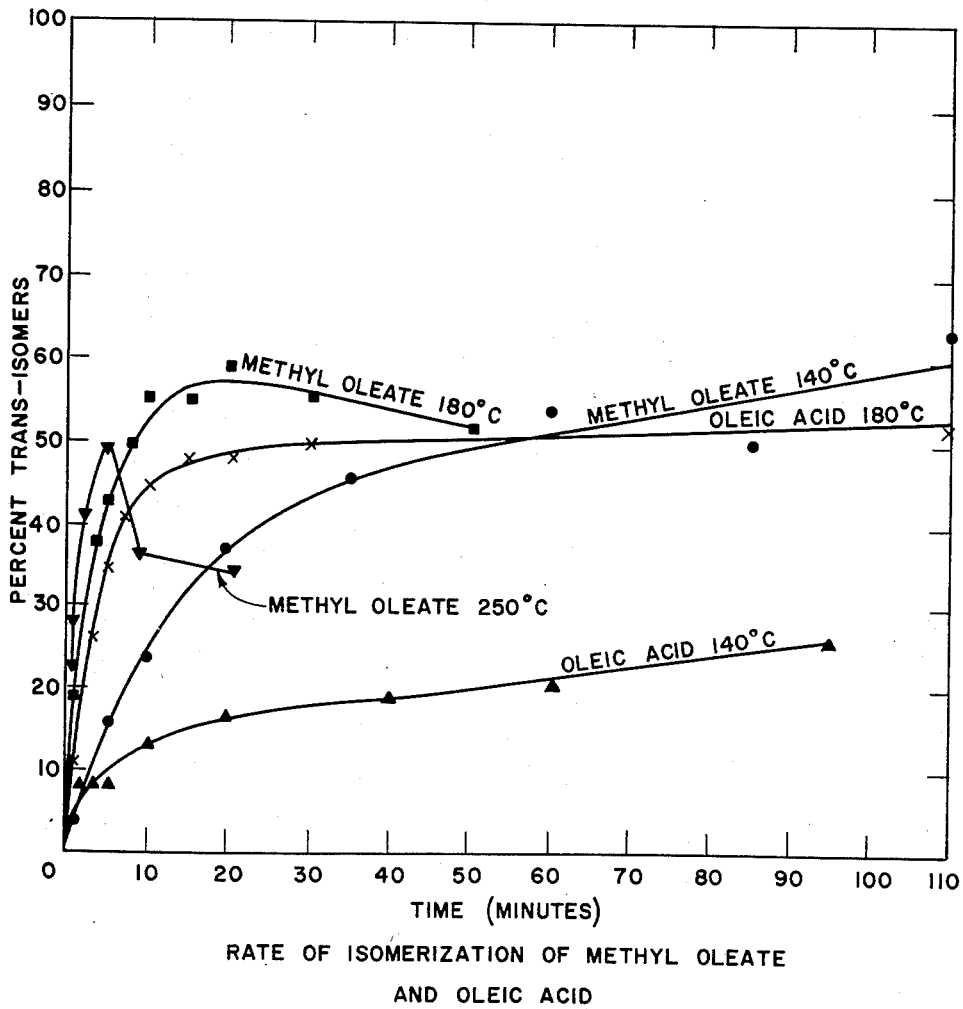
FIG. I.
RATE OF ISOMERIZATION OF METHYL OLEATE AND OLEIC ACID

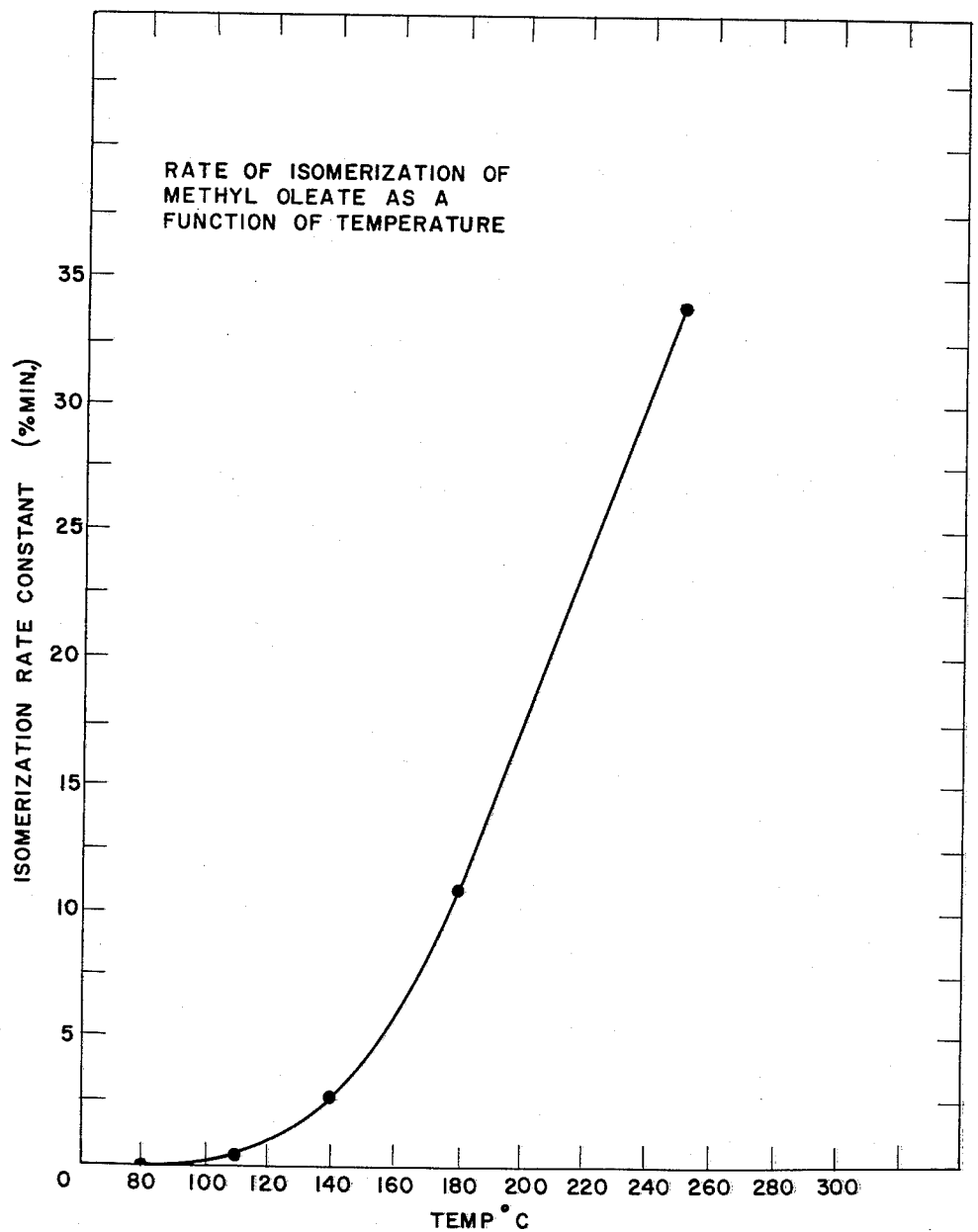

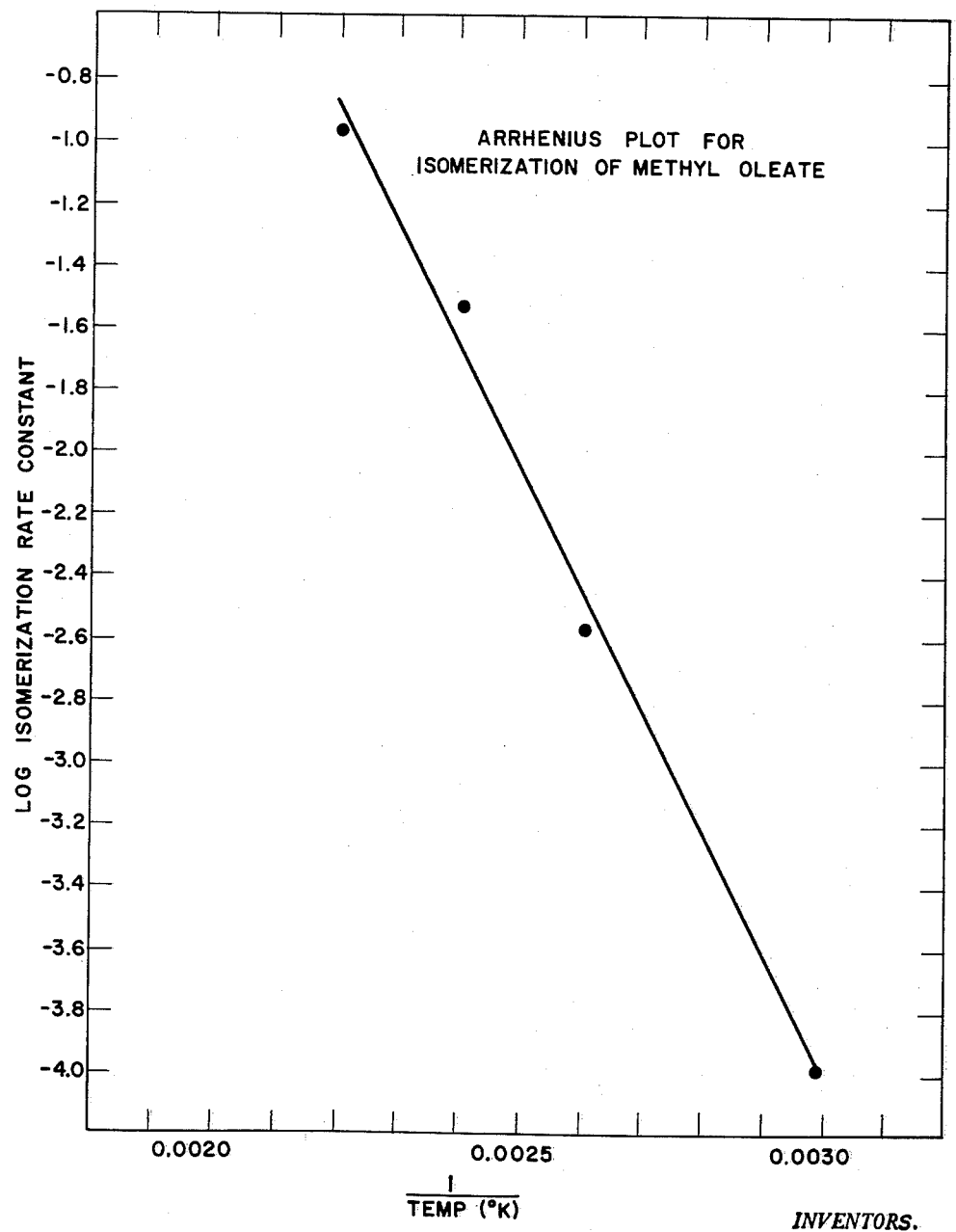

This invention relates to the treatment of oleic acid and derivatives thereof and has particular reference to a process for the isomerization or partial isomerization of oleic acid, oleic acid esters and fats and oils containing oleic acid and/or its esters.

As used herein and in the appended claims, the term "oleic acid derivatives" and similar terms are intended to mean and include oleic acid esters, including esters of monofunctional alcohols such as methyl oleate and isopropyl oleate; esters of polyfunctional alcohols such as ethylene dioleate, synthetic or natural glycerides or glycerol esters such as triolein, and fats and oils containing oleic acid, oleic acid esters or glycerides of oleic acid such as milk fat, butter, palm oil, vegetable butters, lard, soft tallows (greases), cottonseed oil, sunflowerseed oil, safflower oil, peanut oil, corn oil and olive oil.

One of the primary objects of the present invention is to provide a novel process for the isomerization of oleic acid and oleic acid derivatives.

Another object of this invention is to provide an isomerization process for oleic acid and derivatives thereof which is safe and economical to carry out on a production scale, utilizing a relatively inexpensive, re-usable and non-toxic catalyst and requiring relatively short times and mild temperature conditions.

Another object of this invention is to provide a novel process for the production of soaps.

Other objects and advantages of this invention it is believed will be readily apparent from the following detailed description of preferred embodiments thereof when read in connection with the accompanying drawings.

In the drawings:

FIGURE 1 is a graph illustrating the rates of isomerization of oleic acid and methyl oleate at different reaction temperatures when reacted in accordance with the method of the present invention.

FIGURE 2 is a plot of isomerization rate constant vs. temperature for the isomerization of methyl oleate.

FIGURE 3 is an Arrhenius plot for the isomerization of methyl oleate.

Briefly, this invention comprehends within its scope the discovery that oleic acid and its derivatives are isomerized by subjecting the same in either the presence or absence of inert solvents to the action of an acid-activated clay catalyst under relatively low temperature conditions. It has been found that under such conditions two distinct and prominent transformations occur: (1) the cis-olefin, oleic acid, is converted to a mixture of a transoctadecenoic acid (isomers of elaidic acid), and (2) the $\Delta$9-double bond in oleic acid migrates to all or several possible chain positions (C–2 to C–17).

It has been further discovered that for optimum conversion to the trans-isomers the time and temperature of the reaction are quite critical. That is, while relatively broad temperature and time ranges may be utilized, i.e., from as low as room temperature to as high as 250° C., and from as long as several days to as short as a minute or even a few seconds, the reaction time varies inversely with the temperature. Particular care must be taken at the higher temperatures, i.e., above about 180° C., to avoid over-exposure which results in decreased yield of isomerized product. Thus, at reaction temperatures of 180–200° C. reaction times in excess of two hours do not produce significant increase in the extent of isomerization of many of the starting materials and in some cases, such as with methyl oleate, the reaction proceeds through a maximum conversion, continued heating permitting competing reactions (vide supra) which result in a decrease in the extent of isomerization, at optimum catalyst concentrations, as compared with that effected at shorter time periods. At reaction temperatures of about 250° C. the reactions proceed extremely rapidly, substantial isomerization taking place in less than a minute, and after less than 10 minutes (in the case of methyl oleate) the degree of conversion to the isomers drops off. From the standpoint of commercial practicalities a temperature range of from about 100° to about 180° C. is best for batch operations, while for continuous flow operations with short residence times of minutes or even seconds, the higher temperature range of 220–250° C. is most efficacious. Regardless of the particular temperature selected for operation of the process it is, of course, preferred to utilize a reaction time for that temperature which produces optimum isomerization. Such selection of the reaction time for any particular desired reaction temperature is easily made as disclosed hereinafter in connection with FIGURES 1 and 3.

The diminished production of the trans-isomers caused by excessively long reaction times at the higher temperatures are believed to be due to several mechanisms. The major distillable products from such reactions exhibit a characteristically low olefin content, while the rather large undistillable residues (up to 50% of all the end-products) are found to possess greater olefin content than oleic acid. Based upon analysis of the infrared spectra and such conventional analytical determinations as neutralization equivalents, saponification equivalents and iodine values, it is believed that the following competing reactions or mechanisms contribute to the decreases in yields of trans-isomers at the higher temperatures and excessively long reaction times:

(1) The formation of lactones which contribute in part to an over-all diminution of the reaction effluent's olefin content.

(2) The contribution of hydrogen-transfer processes which result in the intermolecular hydrogenation-dehydrogenation of two oleic acid molecules with concomitant formation of stearic acid and octadecadienoic acids. The latter could then dimerize to yield undistillable materials.

At the higher temperatures and longer reaction times, especially in the case of oleic acid, substantial quantities of anhydrides are formed. Moreover, if the isomerization of oleic acid esters is performed in the presence of water or with activated clay from which the water has not been removed at temperatures commensurate with the reaction temperature or higher, then substantial hydrolysis of the esters occurs, leading to the formation of undesirable lactones, acids and anhydrides. Pre-drying of the acid clay and short reaction times minimize the extent of hydrolysis.

The Barrett et al. Patent No. 2,793,219 is of interest in its disclosure of a process of dimerizing monounsaturated fatty acids by heating the same in the presence of crystalline clay and water at temperatures from 180°–300° C. for extended time periods of several hours, conditions which, as indicated above, are not conducive to the production of the isomers and are outside the scope of the present invention, but which, as taught in said patent, are designed for the production of dimeric acids.

The process of the present invention requires the use of acid-activated clay, as opposed to ordinary naturally occurring clays, silica-alumina cracking clays and the like. Natural acid clays may be used, but the processed acid-activated clays are preferred, such as one of the "Filtrols" manufactured by the Filtrol Corporation of Los Angeles, California. "Filtrol" is defined in "Handbook of Material trade Names"; authors, O. T. Zimmerman, Ph.D., and Irvin Lavine, Ph.D.; copyright 1946, 1953; published by Industrial Research Service, Dover, New Hampshire, 1953. This definition reads as follows:

"Filtrol(R), a group of acid-activated adsorbents and catalysts made from the mineral montmorillonite $$(MgCa)OAl_25SiO_2nH_2O$$

They are supplied as fine white powders, 85–95% passing through a 200-mesh screen."

The amount of acid clay may be varied within reasonably wide limits, depending upon the reaction time and temperature and the type of process equipment utilized. For batch operations, generally more than about 1% and preferably above 3%, based on the weight of the oleic acid or derivatives should be used. As much as 30% by weight produces quite satisfactory results, but higher amounts are generally of no particular added value. These considerations do not, of course, apply to continuous flow operations where relatively high catalyst concentrations, i.e., many times the amount of the oleic acid or derivative in contact with the clay, could be achieved.

We prefer to pre-dry the acid clay at temperatures commensurate with the temperature selected for the isomerization reaction or at higher temperatures. Generally, pre-drying at a temperature in the range 120–300° C. is satisfactory. However, the pre-drying of the acid clay must be effected at sufficiently low temperatures so that inactivation of the catalytic properties of the clay does not occur. For example, pre-drying of the acid clay at 1000° C. inactivates the clay.

The following specific examples illustrate the process of the present invention, but it is to be understood that the invention is not to be limited to the specific details thereof.

EXAMPLE 1

The oleic acid was the 233 LL Elaine grade obtained from Emery Industries, Incorporated. Oleic acid (100 g., 0.36 mole), "Filtrol" GR 13 (30 g.), and benzene (200 ml.) were stirred and heated under reflux (80° C.). A Dean and Stark trap was employed to collect the water from the reaction mixture. After 64 hours, the reaction mixture was filtered. The clay was washed with benzene. The filtrate and washings were combined and evaporated at the aspirator, leaving 90 g. of yellow oil. This oil was distilled to give three fractions. Listed are boiling point, weight, neutral equivalent, and iodine number: (1) 155° C./0.35 mm.–184° C./0.38 mm., 70.0 g., N.E. 278; (2) 198° C./0.52 mm.–270° C./0.18 mm., 11.1 g., N.E. 393, I No. 59.7; and (3) residue, 3.6 g.

Infrared spectra of fractions 1 and 2 were identical with that of oleic acid except for a single peak at 10.36μ, characteristic of trans-olefins. The I.R. spectra were obtained with a Perkin-Elmer Model 21 spectrophotometer. Samples for spectral examination were prepared at 10% solutions in carbon tetrachloride and run in 0.094 mm. sodium chloride cells.

Since the infrared spectra are valuable only in distinguishing between cis- and trans-isomers, analyses were conducted to determine whether double bond migration had occurred concurrently with geometric isomerization. Thus, the isooleic acid was ozonized, the ozonide was oxidatively decomposed and the resultant monobasic and dibasic acids were esterfied. These materials were analyzed by gas chromatography. These procedures for Example 1 were as follows:

A 35 g. portion of fraction 1 was dissolved in petroleum ether. A stream of ozone in oxygen from a Welsbach T-23 ozonizer was passed through the solution at 0° C. until a sample of the solution was no longer decolorized by bromine. To the resultant solution was added 200 ml. of 10% sodium hydroxide, and the mixture was then stirred and heated on the steam bath. The resulting clear solution was neutralized with concentrated hydrochloric acid. The mixture was filtered hot through a wet filter paper. The oil retained on the filter was extracted three more times with hot water (95° C.), with care taken not to lose volatile acids. The oil was dissolved in ether, dried over sodium sulfate, and filtered, and the ether was then evaporated, leaving 22.5 g. of monobasic acids. The water solution was reheated to boiling and filtered. The filtrate was evaporated to dryness and the residual solid was extracted with two 100 ml. portions of boiling acetone. The acetone was evaporated from the solution leaving 9.8 g. of dibasic acids. Ethyl esters were prepared from the monobasic and dibasic acid fractions.

The esters were analyzed by gas chromatography in a Lowe machine having a six foot chromatography column (0.25 inch diameter) packed with 20–40 mesh firebrick impregnated with silicone grease (40 parts to 100 parts firebrick) helium being employed as the carrier gas. The ethyl esters of the dibasic acids were chromatographed at a temperature of 330° F. and a helium flow rate of 100 ml./min. The ethyl esters of monobasic acids were run at a temperature of 260° F. and a flow rate of 50 ml./min. The results expressed as mole percent of octadecenoic acids are as follows:

| Double bond position: | Percent |
|---|---|
| 2- | 0.3 |
| 3- | 0.3 |
| 4- | 2.4 |
| 5- | 1.1 |
| 6- | 0.9 |
| 7- | 2.1 |
| 8- | 8.2 |
| 9- | 23.2 |
| 10- | 8.2 |
| 11- | 4.3 |
| 12- | 3.5 |
| 13- | 4.0 |
| 14- | 6.5 |
| 15- | 0.7 |
| 16- | 1.0 |
| Total | 66.7 |

These results show that the oleic acid had been isomerized to a mixture of 2- to 17-octadecenoic acids.

EXAMPLE 2

The process of this example was the same as that of Example 1 except that no solvent for the oleic acid was used and the reaction temperature was 150° C. 101 g. of oleic acid was used and the recovered oil was 80 g. The oil was distilled to give two fractions. Listed are boiling point, weight, neutral equivalent and iodine number (1) 148° C./0.53 mm.–245° C. 1.5 mm., 56 g., N.E. 314, I No. 57.3; and (2) residue, 19 g.

Fraction 1 solidified on standing at room temperature. The I.R. spectrum of fraction 1 was identical with that of oleic acid except for a lactone peak at 5.61μ and a trans configuration peak at 10.36μ.

The ozonation-gas chromatography analysis of fraction 1 follows:

| Double bond position: | Percent |
|---|---|
| 2- | 0.4 |
| 3- | 0.6 |
| 4- | 2.5 |
| 5- | 3.6 |
| 6- | 4.5 |
| 7- | 3.9 |
| 8- | 4.8 |
| 9- | 3.6 |
| 10- | 3.0 |

Double bond position: Percent
- 11- _____ 4.5
- 12- _____ 5.9
- 13- _____ 4.8
- 14- _____ 1.3
- 15- _____ Trace
- 16- _____ 1.0

Total _____ 44.4

It will be noted that with the increase in temperature there was a marked decrease in the quantity of residual 9-octadecenoic acid and a corresponding increase in the quantities of the octadecenoic acid positional esters. Thus the distribution of octadecenoic acids in the products can be controlled by varying the temperature of reaction.

EXAMPLE 3

The process of this example was the same as Example 1 except that 100 g. (0.34 mole) of methyl oleate was substituted for the oleic acid, only 15 g. of the acid clay was utilized and the reaction time was 65 hours. 95 g. of product was recovered and the I.R. spectrum thereof was identical with that of methyl oleate except for a trans configuration at 10.36μ.

EXAMPLE 4

The process of this example was the same as Example 3 except that 88 g. (0.30 mole) of methyl oleate was used, the reaction temperature was 150° C. and the time was 67.5 hours. The product had a saponification equivalent of 261 and an acid No. of 21.8. The I.R. spectrum of the product was identical with that of methyl oleate except for a lactone peak at 5.83μ and a trans configuration peak at 10.36μ.

EXAMPLE 5

The olive oil was California virgin olive oil with an acid number of 2.2, an iodine number of 81.7, and a refractive index at 22° C. of 1.4690. Olive oil (100 g.), "Filtrol" GR 13 (15 g.) and toluene (200 ml.) were stirred and heated under reflux (110° C.). A Dean and Stark trap was used to separate water. After 132 hours at reflux, the reaction mixture was filtered and the catalyst was washed with petroleum ether. The filtrate and washings were combined and evaporated at the aspirator, leaving 85 g. of yellow oil ($n^{22}$ 1.4720) which solidified to a gelatinous material upon standing. The I.R. spectrum of the product was identical with that of olive oil except for a trans configuration peak at 10.36μ. The product had an acid number of 2.5 and an iodine number of 76.

A portion of the oil was saponified as described in the American Oil Chemists' Society official method Cc. 12-41. A 15 g. portion of the solid acids isolated by this procedure was subjected to ozonolysis as described in Example 1 with the following results:

Double bond position: Percent
- 2- _____ Trace
- 3- _____ 0.8
- 4- _____ 3.8
- 5- _____ 2.3
- 6- _____ 2.1
- 7- _____ 3.0
- 8- _____ 6.6
- 9- _____ 24.2
- 10- _____ 8.1
- 11- _____ 1.6
- 12- _____ 0.6
- 13- _____ 0
- 14- _____ 0
- 15- _____ 0
- 16- _____ 0

Total _____ 63.1

From the above Example 5 it will be seen that olive oil is easily isomerized to a mixture of glycerol trans-octadecenoates with virtually no attendant change in iodine number or refractive index. The inventory of octadecenoic acid moieties in the isomerized olive oil is very similar to the distribution observed in the transformation of oleic acid under somewhat similar conditions (see Example 1). Of particular importance is the transformation of the olive oil from a mobile liquid at room temperature to a semisolid gelatinous mass, indicating a utility of the process in hardening fats without the use of hydrogenation.

The specific action of the acid-clay type of catalyst is illustrated by a series of experiments in which isomerization of methyl oleate in the presence of various catalysts was attempted. These experiments were carried out by the charging of 10–20 ml. ampoules with a mixture of 10 g. of methyl oleate (prepared from 233LL Elaine grade oleic acid obtained from Emery Industries, Incorporated, and distilled at 145–150° C. at 0.55 mm. ($n^{21}$ 1.4510)) and 1.0 g. of the desired catalyst. The ampoules were then sealed and placed in an oven at the desired temperature. The vials were agitated vigorously during the heating period and at predetermined intervals were withdrawn and the contents removed for analysis. The degrees of isomerization of the samples and of the dynamic study samples described below were estimated optically by measuring the intensity of the 10.36μ band in the infrared spectra. A Beer's law plot was constructed from the intensity of the 10.36μ band observed for varying concentrations of elaidic acid, methyl elaidate, and trielaidin in carbon tetrachloride solution. The total concentration (0.5 g./2 ml.) of these solutions was kept constant by admixture of appropriate quantities of oleic acid, methyl oleate, and triolein to the standard solutions. In practice, samples of the reaction mixtures were withdrawn periodically, and the suspended catalyst was removed by centrifugation or filtration. A solution of 0.5 g. of the sample was dissolved in 2 ml. of carbon tetrachloride, and the infrared spectra were recorded with a Perkin-Elmer model 21 spectrophotometer using standard 0.094 mm. sodium chloride liquid cells.

In Table I below is set forth the conditions and results of these experiments:

TABLE I

*Percent Isomerization of Methyl Oleate With Various Catalysts*

| Expt. No. | Catalyst | Conditions | | |
|---|---|---|---|---|
| | | 46 hours at 140° C. | 4 hours at 140° C. | 4 hours at 110° C. |
| 1 | Filtrol GR 13 [1] | [2][3] 41.0 | [4] 59.0 | 10.0 |
| 2 | Filtrol GR 58 [1] | [2] 5 40.0 | [6] 20.2 | 6.0 |
| 3 | Filtrol GR 80 [1] | [1] 58.8 | 7.8 | 2.5 |
| 4 | Polystyrene sulfonic acid ion exchange resin. | 16.8 | 4.1 | N.D. |
| 5 | Kidde 58-385 (raw clay) [7] | 5.0 | 4.1 | N.D. |
| 6 | Nalcat HA 1 [8] | 2.5 | 4.2 | N.D. |
| 7 | Nalcat B [8] | 2.5 | 11.5 | N.D. |
| 8 | Kidde 58-398 [9] | [10] 57.0 | [11] 37.7 | 7.0 |
| 9 | Silica gel | 4.1 | N.D. | N.D. |
| 10 | Boron phosphate | 5.0 | N.D. | N.D. |
| 11 | China clay (kaolin) | 4.0 | N.D. | N.D. |

[1] Filtrol Corp. acid-activated montmorillonites.
[2] I.R. spectrum showed lactone peak at 5.65μ.
[3] Acid number equals 36.2.
[4] Acid number equals 24.6.
[5] Acid number equals 37.3.
[6] Acid number equals 13.9.
[7] Kidde Process Corp. natural bentonite.
[8] Synthetic silica-alumina cracking catalyst (National Aluminate Company).
[9] Kidde Process Corp. acid-activated bentonite.
[10] Acid number equals 17.1.
[11] Acid number equals 16.9.

NOTE.—N.D. means not determined.

The process of the present invention is further exemplified by a series of dynamic studies on the behavior of oleic acid and its derivatives in contact with acid-activated clay at various temperatures. The results of these studies are set forth in Tables II, III and IV below. In carrying out these studies, 200 g. samples of the oleic acid-containing material were heated to the desired temperature in a three-necked flask fitted with a thermometer and a condenser. To the well-stirred material in the flask was added the desierd amount (in most cases 20 g., i.e., 10% by weight, but in a few runs 10 g., i.e., 5%, or 6 g., i.e., 3%, as indicated below) of the acid-activated clay ("Filtrol" GR 13 or 80), dried at 120° C. Periodically, samples were withdrawn with a pipette, transfererd to test tubes and quenched. The clay was removed and the samples were analyzed spectrophotometrically to determine the degree of isomerization as described above in connection with Table I. Selected samples from several experiments conducted at 180° C. were submitted for determination of their iodine number, neutral equivalent, and saponification equivalent. For methyl oleate, after 10 minutes of reaction the iodine number was 87.3, acid number was 6.9, and saponification equivalent was 290; after 135 minutes of reaction the iodine number was 85.3, and the acid number was 17.2. For oleic acid after 20 minutes of reaction the iodine number was 84.5, neutralization equivalent was 308, and the saponification equivalent was 296; after 110 minutes of reaction the iodine number was 86, the neutralization equivalent was 312, and the saponification equivalent was 286.

In the following Table II are set forth in terms of percent isomerization, the results of the above-described dynamic experiments as applied to the treatment of methyl oleate:

TABLE II

*Isomerization of Methyl Oleate*

| Reaction Time (min.) | Reaction temperature (° C.) | | | | | | | |
|---|---|---|---|---|---|---|---|---|
| | 80 [1] | 110 [1] | 140 [1] | 140 [2] | 180 [1] | 180 [3] | 180 [4] | 250 [1] |
| 0.7 | | | | | | | | 21.1 |
| 1 | | | 3.7 | <1 | 19.0 | 5.1 | 2.9 | 28.6 |
| 2 | | | | | | | | 41.2 |
| 3 | | | 8.5 | 0.5 | 37.3 | 11.4 | 7.8 | 39.8 |
| 5 | | | 16.0 | | 42.1 | 18.2 | 10.8 | 46.0 |
| 8 | | | | | 49.4 | 29.3 | 13.4 | 48.5 |
| 10 | | | 23.1 | 2.8 | 55.6 | 28.2 | 14.2 | 36.3 |
| 15 | | 0 | | | 55.0 | | | |
| 20 | | | 37.2 | 8.7 | 59.3 | 46.9 | 24.0 | 34.8 |
| 30 | | 0.4 | | 10.0 | 55.8 | 50.3 | 26.9 | |
| 35 | | | 46.0 | | | | | |
| 50 | | | | | 52.2 | | | |
| 60 | <1 | 7.0 | 54.0 | 25.8 | | 51.8 | 38.9 | |
| 85 | | | 50.0 | | | | | |
| 90 | | 11.2 | | 26.7 | | | | |
| 110 | | | 63.1 | | | | | |
| 120 | <1 | 17.1 | | 32.9 | | | | |
| 180 | | 25.2 | | | | | | |
| 240 | <1 | 32.3 | | | | | | |
| 300 | | 38.6 | | | | | | |
| 360 | 2.6 | | | | | | | |
| 480 | 3.8 | | | | | | | |
| 1,440 | 14.9 | | | | | | | |
| 2,880 | 22.6 | | | | | | | |

[1] 10% by weight of "Filtrol" GR 13.
[2] 10% by weight of "Filtrol" GR 80.
[3] 5% by weight of "Filtrol" GR 13.
[4] 3% by weight of "Filtrol" GR 13.

The following Table III sets forth the results of the dynamic experiments as applied to the isomerization of oleic acid and to the isomerization of triolein:

TABLE III

*Isomerization of Oleic Acid and Triolein With 10% by Weight of "Filtrol" GR 13*

| Reaction time (min.) | Reaction temperature (° C.) | | | |
|---|---|---|---|---|
| | 140 [1] | 180 [1] | 180 [2] | 240 [2] |
| 1 | 6.8 | 10.4 | | |
| 3 | 8.1 | 26.2 | | |
| 5 | 8.2 | 35.0 | 14.0 | 20.5 |
| 8 | | 41.7 | | |
| 10 | 13.6 | 44.9 | 15.6 | 25.5 |
| 15 | | 48.0 | | 27.0 |
| 20 | 16.8 | 48.3 | 17.9 | 27.6 |
| 30 | | 50.0 | | |
| 40 | 19.3 | | 18.8 | 30.8 |
| 60 | 20.9 | 52.2 | 20.3 | 31.2 |
| 95 | 26.0 | | | |
| 110 | | 52.0 | | |
| 1,440 | | 25.7 | | |

[1] Oleic acid.
[2] Triolein—10% isomerized before reaction.

The results of the 140° C. and 180° C. methyl oleate and oleic acid runs (10% "Filtrol" GR 13) from Tables II and III, and the 240° C. methyl oleate run from Table II are graphically summarized in FIGURE 1 of the drawings wherein the percent trans-isomers is plotted against the reaction time. The exceptionally rapid isomerization of these compounds is quite apparent from the results. It is interesting to note that the extent of isomerization of oleic acid and methyl oleate reaches a maximum value consistent with the thermodynamic equilibrium of oleic and elaidic acids (i.e., 33% oleic acid and 66% elaidic acid).

In Table IV below are set forth in terms of percent isomerization the results of the above-described dynamic experiments as applied to the treatment of a number of unsaturated glycerides:

TABLE IV

*Isomerization of Glycerides With 10% by Weight of "Filtrol" GR 13* [3]

| Reaction time | Glyceride and reaction temperature (° C.) | | | | | | |
|---|---|---|---|---|---|---|---|
| | 180 | 140 | 180 | 140 | 200 | 140 | 180 [2] |
| | Olive oil | Peanut oil | Safflower oil [1] | Corn oil | | Safflower oil methyl esters | |
| 5 | 5.5 | | 6.2 | 1.1 | | 6.0 | 13.6 |
| 10 | 10.0 | | 8.8 | 1.8 | | 10.9 | 23.2 |
| 15 | | | | 2.1 | | | |
| 20 | 12.5 | | 7.4 | | | 12.2 | 21.1 |
| 30 | | 2.1 | 9.2 | 2.1 | 0 | | |
| 40 | 17.7 | | 12.1 | | | 18.9 | 21.7 |
| 60 | 22.3 | 5.3 | | 3.0 | 7.8 | 19.8 | 23.0 |
| 75 | | | 11.0 | | | | |
| 90 | 22.4 | | | 2.7 | 9.3 | | |
| 120 | | | 13.0 | 3.0 | 8.8 | | |
| 160 | 26.9 | | | | | | |

[1] 1.1% isomerized before reaction.
[2] 10% by weight of "Filtrol" GR 58.
[3] The percent isomerization is not normalized for the oleic content of the respective glycerides.

In obtaining the data for Table IV, the extent of isomerization was again measured spectrophotometrically from the intensity of the 10.36μ trans-absorption band. It was assumed that the extinction coefficients of the mixed glycerides produced from the isomerization reaction did not differ greatly from the value exhibited by trielaidin as reported in the literature. This assumption appears reasonable in view of the fact that the absorption values of isomerized triolein samples compared, within 5%, to the absorption values observed for those fatty acids which were isolated from saponification of the same samples of isomerized triolein. In all instances the rates of isomerization are slow as compared with methyl oleate or oleic acid. Moreover, the degree of isomerization is considerably less than that of the simple oleic acid derivatives. It is believed that the difference in the course of the isomerization reaction is related to the increased size of the glyceride molecule as compared with oleic acid or methyl oleate.

The partially isomerized glycerides are generally more viscous than their progenitors and in some instances they solidify into gelatinous masses. Isomerization of these glycerides is usually accompanied by a small increase in acid value.

The data from Table II and the oleic acid data from Table III have been put into standard kinetic form in Table V below:

TABLE V

Rate Constants for the Isomerization of Methyl Oleate and Oleic Acid

| | Methyl oleate (g.) | Clay (g.) | Reaction temperature (° C.) | k (percent minute) |
|---|---|---|---|---|
| 1 | 100 | "Filtrol" GR 13 (10) | 80 | 0.010 |
| 2 | 100 | do | 110 | 0.20 |
| 3 | 100 | do | 140 | 2.74 |
| 4 | 100 | do | 180 | 11.0 |
| 5 | 100 | do | 250 | 33.7 |
| 6 | 100 | Same as 1 except 3 grams | 180 | 1.21 |
| 7 | 100 | Same as 1 except 5 grams | 180 | 4.03 |
| 8 | 100 | "Filtrol" GR 80 (10) | 140 | 0.42 |
| | Oleic acid | | | |
| 9 | 100 | Same as 1 | 140 | 0.69 |
| 10 | 100 | do | 180 | 7.9 |

The data from the dynamic experiments smoothly fit the first-order equation:

$$\frac{2}{3} Ln \left(\frac{100 - bx_1}{100 - bx}\right) = k(t - t_1)$$

where $b = \frac{3}{2}$, $x_1$ and $x$ are the concentrations of isomerides at times $t_1$ and $t$ respectively and $k$ is the isomerization rate constant or specific reaction rate. Thus $k$ represents the percent of isomerization of the oleic acid derivative per minute. For example, at 250° C., 33% of the methyl oleate is isomerized in one minute. After two minutes, 33% of the residual methyl oleate (100−33) is isomerized and thus a total of 55% of the initial reactant is isomerized. In deriving the above equation, the equilibrium constant of 2 for the oleic-elaidic acid equilibrium was used.

The temperature dependence of the reaction for methyl oleate is shown in FIGURES 2 and 3. As the temperature is increased the rate of reaction is increased. In FIGURE 2, the isomerization rate constant is plotted against the temperature of reaction. FIGURE 3 is an Arrhenius plot for the methyl oleate isomerization, wherein the logarithm of the rate constant is plotted against the reciprocal of the absolute temperature. The equations for this plot are:

$$\log \frac{k_2}{k_1} = \frac{E}{2.303R}\left(\frac{T_2 - T_1}{T_2 T_1}\right)$$

or $$k = ae^{\left(\frac{-E}{RT}\right)}$$

where $k_2$ and $k_1$ are the rate constants at the absolute temperatures (° K.) $T_2$ and $T_1$, respectively, E is the activation energy (18,0±2.0 kilo cal), R is the gas constant (1.987 cal./deg.).

Products produced in accordance with the present invention are capable of numerous end uses. Thus, in addition to the indicated utility of the process in hardening fats, the products find utility as chemicals for further processing. For example, the simplicity and economy of the isomerization process of the present invention is admirably suited to the preparation of elaidic-acid isomers and thence to soaps.

To specifically illustrate the utility of the present invention as applied to the production of soap, a number of sodium soaps were prepared from oleic acid, elaidic acid and selected isomerized materials. The detergency properties, in terms of the difference in reflectance of soiled cotton swatches before and after washing, were determined with the following apparatus and conditions:

The detergency properties of a group of soap solutions were determined under arbitrary conditions using Standard Cotton Soil Cloth. The following apparatus and conditions were employed:

Machine used: "Terg-O-Tometer"
Speed of machine: 150 r.p.m.
Arc of rotation: 320°
Concentration of detergent: 0.25%
Wash and rinse time: One 15 min. wash, two 5 min. rinses
Temperature of wash and rinse water: 60° C.
Water hardness: 300 p.p.m.
Fabric used: Three "6 x 6" swatches of Standard Cotton Soil Cloth In each case three swatches of the soil cloth were used to obtain three sets of reflectance values for averaging. The results of these tests are summarized in Table VI below:

TABLE VI

Summary of Sodium Soap Evaluations

| Expt. No. | Origin of soap | ΔR [1] |
|---|---|---|
| 1 | Oleic acid | 11.3 |
| 2 | Elaidic acid | 25.6 |
| 3 | Oleic acid heated over acid-clay for 64 hours in refluxing benzene (80° C). | 21.3 |
| 4 | Methyl oleate heated over acid-clay for 2 hours at 140° C. | 18.0 |
| 5 | Oleic acid heated over acid-clay for 13 hours at 180° C. | 6.6 |
| 6 | Oleic acid heated over acid-clay for 24 hours in refluxing o-dichlorobenzene (180° C.)—first distillation fraction.[2] | 3.8 |

[1] Average difference in reflectance of a soiled cotton swatch before and after washing.
[2] Boiling range (° C./mm.): 115/0.15–200/0.08.

The magnitude of the difference in the reflectance of the cloth before and after washing is a measure of the detergent's efficiency. Clearly the trans-soap (sodium elaidate) is significantly superior to the cis-soap (sodium oleate). Moreover, the soaps prepared from oleic acid or methyl oleate which had been submitted to isomerization under the relatively mild conditions of the process of the present invention (experiments 3 and 4) are quite comparable in detergency to sodium elaidate. The soaps produced from drastically isomerized materials (experiments 5 and 6) are clearly inferior to sodium elaidate or oleate. Undoubtedly this latter phenomenon is related to the profound molecular change incurred under these isomerization conditions.

The following is a specific example of a preparation of a soap from methyl oleate isomerized in accordance with this invention (experiment No. 4, Table VI):

The isomerized methyl oleate sample was saponified and the free acid isolated prior to soap formation. A 10.0 g. portion of acid was stirred rapidly with 50 to 70 ml. of distilled water while sodium hydroxide solution (4.73 N) was added dropwise from a buret. The pH of the mixture was determined after each addition. The addition was discontinued when an 0.05 ml. increment of base gave the most abrupt change in pH (neutralization point). The final pH of the soap solutions ranged from 10.0 to 11.2. The solution was then diluted to 200 ml. (5% concentration of soap). Sodium elaidate precipitated at this concentration and was then warmed to effect solution before further dilution.

Many soaps can, of course, be prepared from the isomerized products of the present invention. For example, the products may be saponified to produce any desired metal soap.

Having fully described our invention, it is to be understood that we do not wish to be limited to the details set forth, but our invention is of the full scope of the appended claims.

We claim:

1. A process for the cis-trans isomerization of oleic acid and derivatives thereof which comprises the step of heating a material selected from the group consisting of oleic acid, oleates and mixtures thereof in the presence of acid clay at a temperature in the range of room temperature to about 250° C. and for periods of time varying inversely with the temperature, the reaction period being less than about two hours at temperatures in excess of about 180° C.

2. The process of claim 1, wherein the selected material is oleic acid.

3. The process of claim 1, wherein the selected material is methyl oleate.

4. The process of claim 1, wherein the selected material is a glyceride.

5. The process of claim 1, wherein the selected material is olive oil.

6. The process of claim 1, wherein the selected material is corn oil.

7. The process of claim 1, wherein the selected material is peanut oil.

8. The process of claim 1, wherein the selected material is safflower oil.

9. A process for the cis-trans isomerization of oleic acid and derivatives thereof which comprises the step of heating a material selected from the group consisting of oleic acid, oleates and mixtures thereof in the presence of acid clay under reaction conditions in accordance with the Arrhenius plot of FIGURE 3 of the drawings herein.

10. A process for the cis-trans isomerization of oleic acid and derivatives thereof which comprises the step of heating a material selected from the group consisting of oleic acid, oleates and mixtures thereof in the presence of acid clay at a temperature in the range of about 100° to about 180° C. and for periods of time varying inversely with the temperature.

11. The process of claim 10 wherein the acid clay is an acid-activated clay utilized in the amount of 1–30% by weight of the selected material.

12. The process of claim 1 further comprising the step of saponifying the isomerized product to produce a soap thereof.

13. The process of claim 9 further comprising the step of saponifying the isomerized product to produce a soap thereof.

14. The process of claim 4 wherein the acid clay is an acid-activated clay utilized in the amount of 1–30% by weight of the selected material.

15. The process of claim 1 wherein the reaction temperature is within the range 220°–250° C. and the reaction time is of the order of one minute.

16. The process of claim 1, wherein the temperature and time conditions are selected to produce cis-trans isomerization and double bond migration, without the production of appreciable quantities of dimerized material.

17. The process of claim 10, wherein the temperature and time conditions are selected to produce cis-trans isomerization and double bond migration to a plurality of chain positions, without the production of appreciable quantities of dimerized material.

18. The process of claim 16, wherein the selected material is oleic acid.

19. The process of claim 9, wherein the selected material is methyl oleate.

References Cited in the file of this patent

UNITED STATES PATENTS

| | | |
|---|---|---|
| 2,405,380 | Turk et al. | Aug. 6, 1946 |
| 2,793,219 | Barrett | May 21, 1957 |
| 2,793,220 | Barrett | May 21, 1957 |

OTHER REFERENCES

Turk et al.: Paint, Oil and Chemical Review, 10, 11 (December 1943).

Bailey: Industrial Oil and Fat Products, 2nd edition, 1951, Interscience Publishers, Inc., New York, N.Y., pages 19, 20 and 71.

Eckey: Vegetable Fats and Oils, pages 166–167, ACS Monograph No. 123, Reinhold Pub. Co., New York, N.Y.